United States Patent
Enigma

(10) Patent No.: US 10,244,203 B1
(45) Date of Patent: Mar. 26, 2019

(54) ADAPTABLE CAPTIONING IN A VIDEO BROADCAST

(71) Applicant: Elemental Technologies, Inc., Portland, OR (US)

(72) Inventor: Brian A. Enigma, Portland, OR (US)

(73) Assignee: Amazon Technologies, Inc., Reno, NV (US)

( * ) Notice: Subject to any disclaimer, the term of this patent is extended or adjusted under 35 U.S.C. 154(b) by 55 days.

(21) Appl. No.: 13/859,933

(22) Filed: Apr. 10, 2013

Related U.S. Application Data

(60) Provisional application No. 61/786,447, filed on Mar. 15, 2013.

(51) Int. Cl.
*H04N 7/088* (2006.01)

(52) U.S. Cl.
CPC ................... *H04N 7/0882* (2013.01)

(58) Field of Classification Search
CPC ............. H04N 21/4884; H04N 21/435; H04N 7/0882; H04N 7/0885; G06F 17/289
USPC .................................................. 725/136–137
See application file for complete search history.

(56) References Cited

U.S. PATENT DOCUMENTS

| | | | | |
|---|---|---|---|---|
| 7,130,790 B1 * | 10/2006 | Flanagan | ............... | G06F 17/289 704/2 |
| 8,695,048 B1 * | 4/2014 | Kellicker | ......... | H04N 21/47202 348/468 |
| 2005/0075857 A1 * | 4/2005 | Elcock | .................. | G06F 17/289 704/2 |
| 2005/0128350 A1 * | 6/2005 | Kim | ........................ | H04N 5/445 348/468 |
| 2005/0210511 A1 * | 9/2005 | Pettinato | ................. | G06F 9/542 725/61 |
| 2006/0034590 A1 * | 2/2006 | Teramoto | ................. | H04N 5/85 386/247 |
| 2006/0184994 A1 * | 8/2006 | Eyer | .................. | H04N 21/2335 725/136 |
| 2007/0106516 A1 * | 5/2007 | Larson | .................. | G10L 13/033 704/270 |
| 2007/0294738 A1 * | 12/2007 | Kuo | .................... | H04N 21/4263 725/116 |
| 2008/0018791 A1 * | 1/2008 | Ramaswamy | ...... | H04L 12/2801 348/563 |
| 2008/0022343 A1 * | 1/2008 | Hodzic et al. | ................ | 725/115 |
| 2008/0066138 A1 * | 3/2008 | Bishop | .................. | G06F 17/289 725/137 |

(Continued)

OTHER PUBLICATIONS

"EIA-608", http://en.wikipedia.org/w/index.php?title=EIA-608&oldid=538794110, 6 pages, Feb. 18, 2013.

(Continued)

*Primary Examiner* — Nathan J Flynn
*Assistant Examiner* — Tung T Trinh
(74) *Attorney, Agent, or Firm* — Hogan Lovells US LLP

(57) ABSTRACT

An encoder and a re-packager circuit. The encoder may be configured to generate one or more bitstreams each having (i) a video portion, (ii) a subtitle placeholder channel, and (iii) a plurality of caption channels. The re-packager circuit may be configured to generate one or more re-packaged bitstreams in response to (i) one of the bitstreams and (ii) a selected one of the plurality of caption channels. The re-packaged bitstream moves the selected caption channel into the subtitle placeholder channel.

20 Claims, 6 Drawing Sheets

(56) References Cited

U.S. PATENT DOCUMENTS

| | | | | |
|---|---|---|---|---|
| 2008/0148336 A1* | 6/2008 | Walter | ............ | H04N 21/235 |
| | | | | 725/137 |
| 2010/0020234 A1 | 1/2010 | Smith | ............ | H04N 5/445 |
| | | | | 348/468 |
| 2010/0194979 A1* | 8/2010 | Blumenschein | ...... | G06F 17/289 |
| | | | | 348/468 |
| 2011/0066744 A1* | 3/2011 | Del Sordo | ............ | H04N 21/235 |
| | | | | 709/231 |
| 2011/0122314 A1* | 5/2011 | Bhat | ............ | H04N 21/4884 |
| | | | | 348/465 |
| 2011/0164673 A1* | 7/2011 | Shaffer | ............ | H04N 7/0885 |
| | | | | 375/240.01 |
| 2011/0221873 A1* | 9/2011 | Eyer | ............ | H04N 19/597 |
| | | | | 348/51 |

OTHER PUBLICATIONS

"CEA-708", http://en.wikipedia.org/w/index.php?title=CEA-708&oldid=533061546, 9 pages, Jan. 14, 2013.

\* cited by examiner

US 10,244,203 B1

ADAPTABLE CAPTIONING IN A VIDEO BROADCAST

This application relates to U.S. Provisional Application No. 61/786,447, filed Mar. 15, 2013, which is hereby incorporated by reference in its entirety.

FIELD OF THE INVENTION

The present invention relates to digital video generally and, more particularly, to a method and/or architecture for adaptable captioning in a video broadcast system.

BACKGROUND OF THE INVENTION

Conventional captioning systems allow a separate text channel to be sent (or encoded) within a video signal. EIA-608, also known as "line 21 captions" and "CEA-608", are standards for closed captioning for NTSC TV broadcasts in the U.S., Canada, and Mexico. EIA-608 defines four possible caption "channels", although many televisions only conveniently offer two (captions enabled, captions disabled, alternate caption channel enabled—typically Spanish). CEA-708 is the standard for closed captioning for ATSC digital television (DTV) streams in the U.S. and Canada. There are quite a few video and internet-connected devices that, for various reasons, only offer a subset of the full captioning/subtitling feature set available under the standards. CEA-708 defines 63 possible channels, but many televisions only offer enabled/disabled at the convenient touch of a button, with the specific page selection hidden away on an obscure menu. Apple devices (i.e., iPhone, iPad) will play back 608 captions, but only the first channel. Many other cable boxes and software players behave similarly to televisions that make basic enable/disable selections convenient, but channel selection of a particular caption difficult or not even possible.

In conventional approaches, 708 captions (as well as 708-wrapped-608) are attached to the elementary video stream by the video encoder. The space the captions use is accounted for in the overall bandwidth of the stream. Typically, the encoder passes through captions from the input video, or merges the captions from a secondary source (i.e., SCC files). The caption bytes get attached to the video. The captions are not modified again. The device playing the stream can then ignore the captions or select an individual caption channel for playback. In conventional systems, selecting caption channels beyond the first channel is either difficult or not possible, depending on the feature set implemented in the end device.

It would be desirable to implement a captioning system that allows a source device to place a selectable caption channel in a priority position in a video stream.

SUMMARY OF THE INVENTION

The present invention concerns an apparatus comprising an encoder and a re-packager circuit. The encoder may be configured to generate one or more bitstreams each having (i) a video portion, (ii) a subtitle placeholder channel, and (iii) a plurality of caption channels. The re-packager circuit may be configured to generate one or more re-packaged bitstreams in response to (i) one of the bitstreams and (ii) a selected one of the plurality of caption channels. The re-packaged bitstream moves the selected caption channel into the subtitle placeholder channel.

The objects, features and advantages of the present invention include providing a method and/or architecture for implementing a captioning system that may (i) receive and/or store multiple caption channels and fan the caption channels into individual video channels, (ii) facilitate compliance with evolving disability and/or captioning laws, (iii) allow online video sources to have selectable captions for improved accessibility of internet sites, (iv) support multilingual applications, (v) enhance usability of video consumption devices with limited multilanguage caption ability and/or (vi) reduce the overhead needed to store the video streams and/or captions on a server.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Embodiments of the invention insert a placeholder caption channel in a video stream, store multiple single-channel caption streams in parallel, and/or synchronize a selected caption stream with the video stream. Extra caption channels are not directly presented (or served) to an end user, but a placeholder is sent and (optionally) swapped out for a selected caption track available during playback of the stream. The process simplifies player specifications and/or user interfaces of end devices. The player only needs to be capable of playing a single caption channel. Such a system reduces server overhead. A single copy of the video may be stored, allowing a selected caption channel to be added prior to broadcasting.

Figure 1:
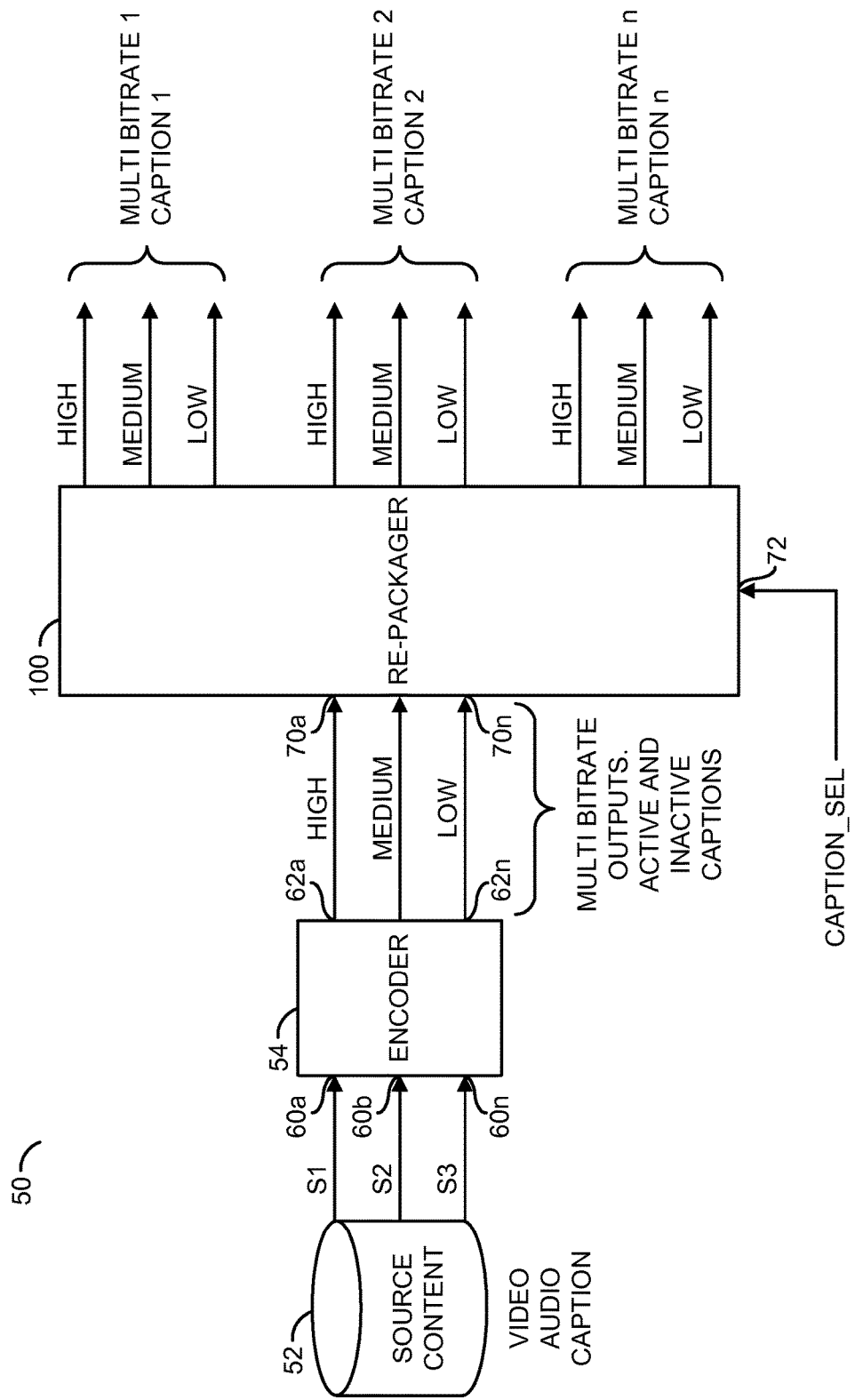
FIG. 1 is a diagram of an embodiment of the present invention.

Referring to FIG. 1, an apparatus 50 is shown. The apparatus 50 generally comprises a block (or circuit) 100, a block (or circuit) 52, a block (or circuit) 54. The circuit 100 may be implemented as a re-packager (or caption modification) circuit. The circuit 52 may be implemented to store source content. The circuit 52 may store source content that has video, alternate audio content and/or alternate caption content. The circuit 52 may present a number of source signals (e.g., S1, S2, and/or S3). The circuit 54 may be implemented as an encoder circuit. While one encoder 54 is shown, a plurality of encoders 54 may be implemented in certain design implementations. The circuit 54 may have a number of inputs 60a-60n and a number of outputs 62a-62n. The encoder circuit 54 may generate a number of bitstreams (e.g., HIGH, MEDIUM, LOW, etc.). The signal HIGH, the signal MEDIUM and/or the signal LOW (or other bitstreams) normally include active and/or inactive caption channels.

The circuit 100 may have a number of inputs 70a-70n and an input 72. The input 70a-70n may receive the bitstream signals HIGH, MEDIUM and LOW. The signal 72 may receive a signal (e.g., CAPTION_SEL). The re-packager circuit 100 may generate a plurality of multibitrate signals (e.g., MULTIBITRATE1, MULTIBITRATE2, MULTIBITRATEn). Each of the multibitrate signals may include a HIGH, a MEDIUM, and a LOW bitrate sub-signal. Each of the multibitrate sub-signals may include a caption signal embedded within the multibitrate signal. For example, the signal MULTIBITRATE1 may include caption 1, the signal MULTIBITRATE2 may include the caption 2, etc.

The video, audio, and/or multiple caption signals S1, S2, and/or S3 may be delivered to the encoder 54. The signal S1, S2, and/or S3 may be sent via files, SDI, network stream, or similar transmission media. The re-packager 100 may then generate the multibitrate outputs, attaching the primary and/or other caption packets. The output of the re-packager 100 may be a network stream, stored as files, or other types of storage. Stored files may be used if the system 50 specifies replayability.

The circuit 100 normally receives video with active and/or inactive captions from the encoder 54 and generates the signals MULTIBITRATE1, MULTIBITRATE2, and/or MULTIBITRATE3. In one example, each of the signals MULTIBITRATE1, MULTIBITRATE2, and/or MULTIBITRATE3 may include a number of caption languages (e.g., one with each inactive/secondary caption language promoted to the primary language). In one example, the caption modification circuit 100 may be implemented as part of the encoder 54 (in which case the circuit 100 may produce output files and/or may produce network streams) or the circuit 100 may be implemented closer to the end user (e.g., so that the majority of the workflow is done on the signals MULTIBITRATE1, MULTIBITRATE2, and/or MULTIBITRATE3 with including all of the captions).

The encoder 54 may generate multiple "primary" caption streams and attach them to video in a unique way (e.g., using the Channel 3/4 of 708-wrapped-608 or using alternate country and/or provider codes for h.264 and/or alternate user_data_identifier/user_data_type_code for MPEG2). The system 50 may "hide" the other captions in the video stream in a way that does not interfere with downstream video processing and playback and/or in a way such that the active and inactive captions may be easily toggled without re-encoding the video or having multiple copies of the video (differing only by captions) stored and taking up disk space.

Figure 2:
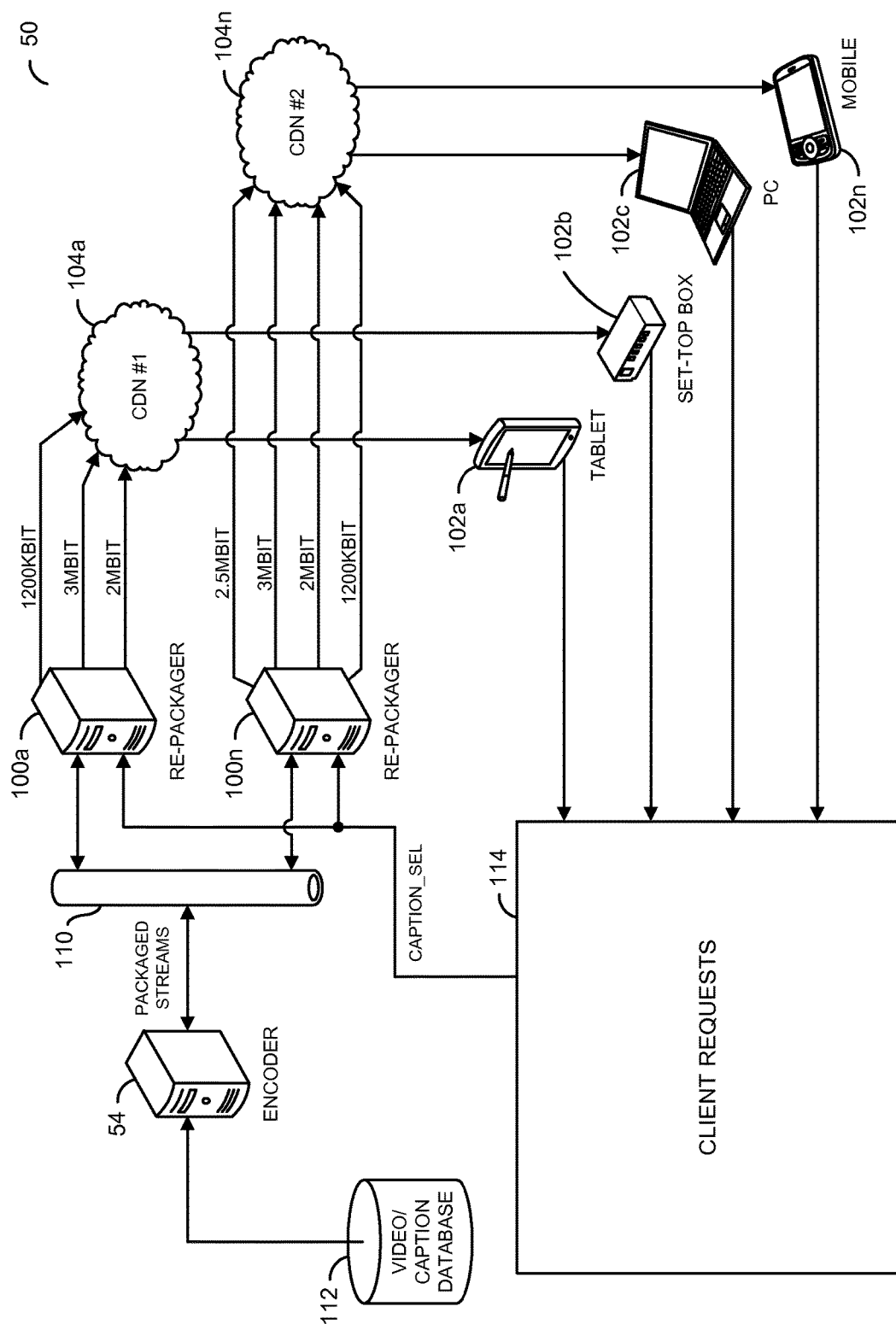
FIG. 2 is a diagram illustrating an example system in accordance with embodiments of the present invention.

Referring to FIG. 2, a more detailed diagram of the system 50 is shown illustrating a content distribution system in accordance with various implementations. The system 100 generally comprises a number of circuits (or devices) 102a-102n, a number of networks 104a-104n, a number of circuits (or devices) 100a-100n, a circuit (or device) 110, a block (or circuit) 112, and a block (or circuit or device or program) 114. The devices 102a-102n may be implemented as client devices. In one example, the networks 104a-104n may be implemented as content distribution networks (CDNs)/mobile carriers (MCs). The devices 100a-100n may be implemented as a plurality of re-packager circuits. The device 54 may be implemented as an encoder. The device 110 may be a content provider network. The device 112 may be video and caption database. The device 114 may service client requests. The device 114 may be implemented as a hardware device (e.g., a network switch) or a module, such as a software program running on a server. The clients may be HTTP based and may request and receive data from the networks 104a-104n. The device 114 may generate different URLs for the different captioning types since the stream may be cached in the networks 104a-104n. In one example, the URLs may be in a manifest or be predetermined URLs.

The re-packager circuits 100a-100n, the encoder 54, the content provider network 110, and/or the video caption database 112 may be located, in one example, at the location of a video provider. For example, a local cable television provider may have such equipment.

In various examples, the circuit 100 may be implemented as a component within the encoder 54, as a separate component before the CDNs 104a-104n, inside the CDNs 104a-104n, or through a proxy server on the other side of the CDNs 104a-104n. The circuit 100 may be used to modify the active and/or inactive captions generated by the encoder 54 and/or rearrange the captions, positioning the desired caption language into the primary caption slot. The circuit 100 does not normally implement encoding. Rather, the circuit 100 swaps (or rearranges) the caption payloads around and/or sets/clears flags indicating which caption packet is the primary caption stream. In various implementations, the circuit 100 may be implemented as a web server appliance (e.g., that one of the client devices 102a-102n sends web requests into to select a language), some other kind of server, or a statically configured device to pass through and/or select and/or move a specific caption language to the primary caption location.

In one example, various player applications may reside on the number of client devices 102a-102n. The client devices 102a-102n may include computers, set-top boxes, cellular telephones, tablets, other mobile devices, etc. The client devices 102a-102n may be configured to receive content (e.g., video, audio, audio-video, etc.) from one or more of the networks 104a-104n. The client devices 102a-102n may be connected to one or more of the networks 104a-104n using wired (e.g., cable), wireless (e.g., Wi-Fi, satellite, etc.), third generation (3G) links, fourth generation (4G) links, and/or any other appropriate medium now planned or not yet envisioned. Communication between the client devices 102a-102n and the networks 104a-104n may be handled by protocols including, but not limited to, HTTP and/or RTMP. Various streaming technologies, such as Pantos from Apple, Inc. or Smooth Streaming from Microsoft Corp., may also be implemented. The particular format used to transfer the video between the networks 104a-104n and the end user devices 102a-102n may be varied to meet the design criteria of a particular implementation.

The networks 104a-104n generally provide a plurality of streams to be available to the client devices 102a-102n. The client devices 102a-102n generally select one of the plurality of available streams based on particular capabilities of one of the client devices 102a-102n. The plurality of streams are generally created by the encoder 54. For example, the encoder 54 may encode content via multicast IP on the content provider network 110. However, the content may also include raw video on SDI, files over FTP, etc. The content provided by the encoder 54 may include packaged streams containing video and caption channels. Parameters used by the encoder 54 in encoding the plurality of streams are generally managed/adjusted by the re-packager 100 (e.g., via the network 110). While one encoder 54 is shown, a plurality of encoders may be implemented to meet the design criteria of a particular implementation.

The re-packager 100 may receive one or more client requests from the device 114. The client requests are received from one or more of the client devices 102a-102n viewing the live event, requesting a VOD asset, etc. The client requests from the device 114 may be automatically generated (e.g., computer generated) by the client devices 102a-102n. In one example, the re-packager 100 may select video and caption channels from the database 112 based on the client requests from the device 114. The encoder 54 may re-package streams sent to the re-packaging device(s) 100a-100n to change the caption content, based upon the client requests received from the device 114, which are normally received from the client devices 102a-102n. A new client manifest may be sent to the player(s) 102a-102n, so that the player(s) 102a-102n may choose to play a new stream when appropriate. While the block 114 has been described as a device, the function performed by the block 114 may be, in one example, embedded within the encoder, embedded within the re-packager circuits 100a-100n, or implemented as a stand alone server device. The particular implementation for receiving and forwarding the signal CAPTION_SEL, may be varied to meet the design criteria of a particular implementation.

The re-packager circuits 100a-100n will normally receive multiple caption sources (either distinct sources, multiple channels from a single source, or some combination) and split the sources into multiple caption tracks, each with a single channel. For instance, the re-packager circuits 100a-100n may receive an input as a 708-wrapped-608 caption track that has English on channel 1 and Spanish on channel 2. Channel 1 may be broken into two separate caption tracks, each with a given language on channel 1.

The encoder 54 may then attach empty (e.g., NULL or placeholder) caption packets to the elementary video stream. The empty caption packets provide a placeholder to account for the bandwidth of the caption, but would not necessarily contain playable data. The encoder 54 may then pass along (for streaming) or save (for video-on-demand) the multiple parallel caption tracks to the device or software serving video to the end users. Each of the parallel caption tracks would normally contain only the 608/708 data for a single language, plus frame-accurate timing information for precise re-insertion. In another example, rather than a placeholder, a default language caption may be presented in the default location.

When one of the devices 102a-102n (or player software) requests a video to start playing, the request may contain a portion of the language of a specific caption. The repackager circuits 100a-100n would then generate an A/V stream to be sent to the specific player (e.g., an UDP, an individualized HTTP/RTMP, a URL, etc.). The re-packager 100 may then swap out the placeholder packets (or default language packets) for packets of the desired language. The selected one of the devices 102a-102n would then see the requested language as the only caption language available, to be presented on channel 1. During playback, the player 102a-102n may send an out-of-band message to the re-packager circuit 100. The re-packager circuit 100 may then swap out a different caption language stream (e.g., containing another language, returning back to the placeholder packets, etc.).

Figure 3:
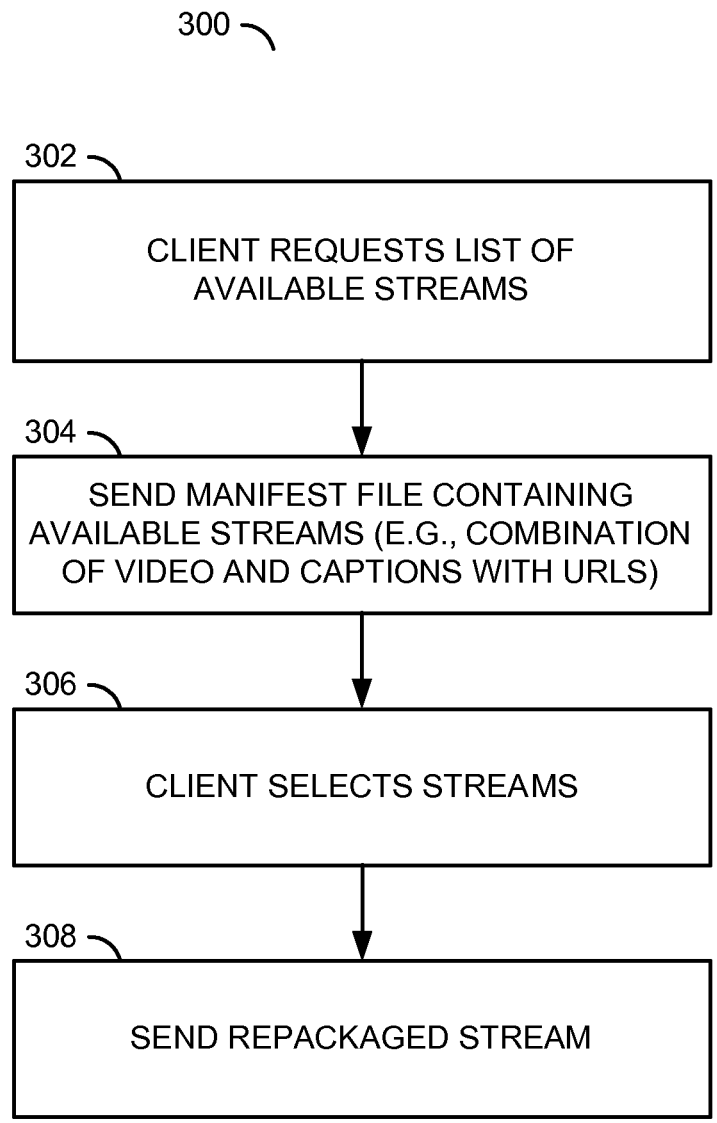
FIG. 3 is a flow diagram illustrating an example client request process in accordance with embodiments of the invention.

Referring to FIG. 3, a flow diagram is shown illustrating a process 300 in accordance with an embodiment of the present invention. In one example, the process (or method) 300 may comprise a step (or state) 302, a step (or state) 304, a step (or state) 306, and a step (or state) 308. In the step 302, one of the requesting clients 102a-102n (e.g., 102a) requests a list of streams with captions. The client request may be as simple as an HTTP request of a web page, or a more elaborate binary data protocol. The particular format of the client requests may be varied to meet the design criteria of a particular implementation. In the step 304, the re-packager 100 determines which videos are available and which captions and/or alternate-caption tracks are available. One of the re-packager circuits 100a-100n may then generate a list of the possible combinations and/or permutations of video tracks and/or caption tracks. The re-packager 100 may then send the list back to the requesting client 102a. The response to the user may be as simple as a human-readable HTML page (e.g., with clickable links), something more computer-friendly (e.g., a manifest file served via HTTP), or a more elaborate binary data protocol. In the step 306, the requesting client 102a may select a stream and/or requests the stream from the re-packager 100. The selection made by the requesting client 102a may be based on human action or may be automatically performed by player software based on previously stated preference (e.g., geolocation, etc.). In the step 308, the re-packager 100 re-packages the video with the desired caption packets (if repackaging is needed) and serves the result back to the requesting client 102a.

In one example, the swapping logic of the re-packager 100 may be implemented on a server. In another example, the swapping logic may be implemented on an outer layer of the player (or user device). In another example, the swapping logic may be implemented on a proxy server between the video server and player.

Figure 4:
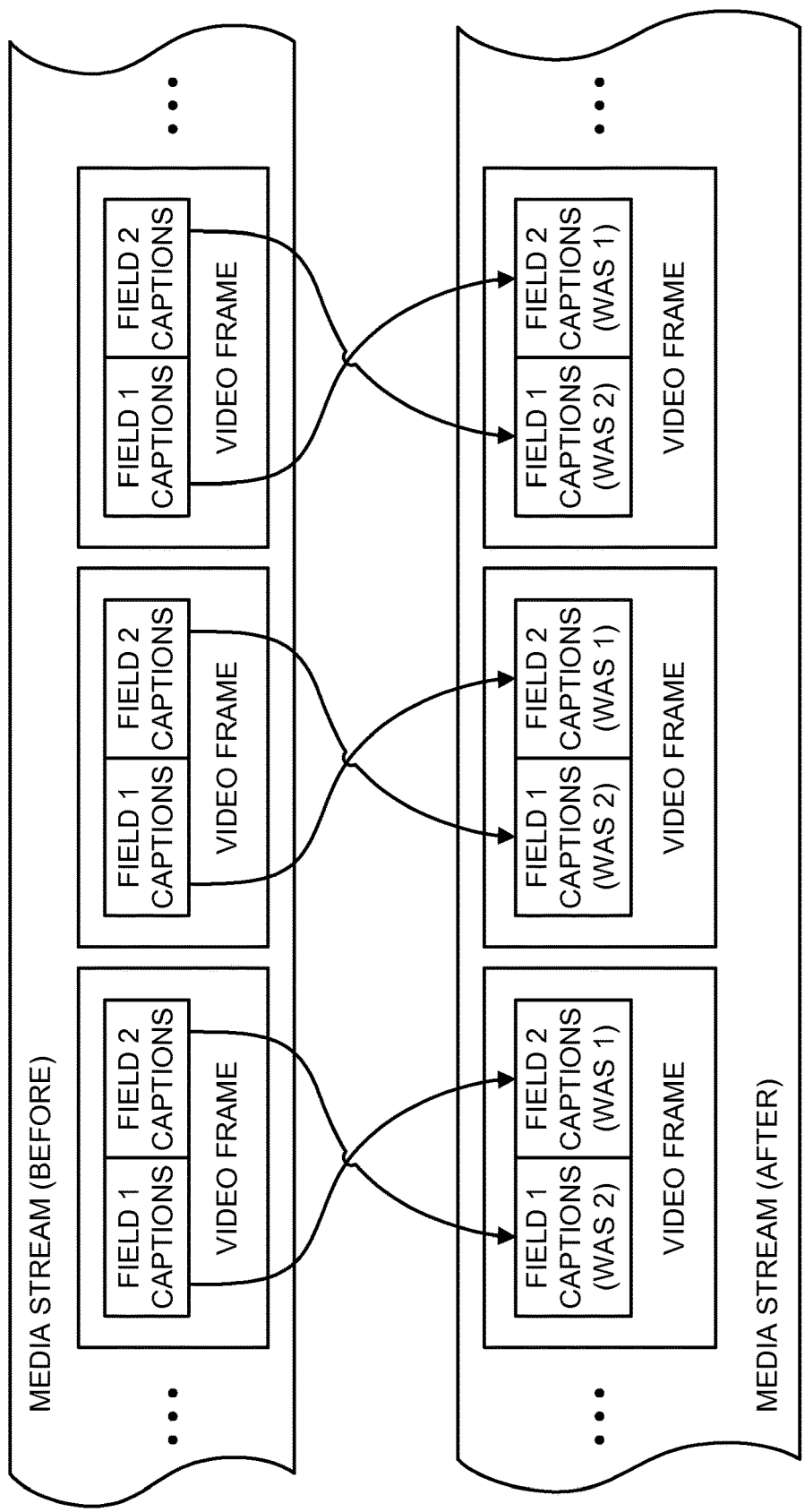
FIG. 4 is a diagram illustrating an example of channel swapping compliant with the CEA-708 and/or EIA-608 standards.

Referring to FIG. 4, a diagram is shown illustrating an example of channel switching compliant with the CEA-708 and EIA-608 standards. Standard 708-wrapped-608 captioning (CEA-708-D) stores 608 captions in the user data of video frames. Caption CC_DATA structures tagged as "field 1" contain caption channels 1 and 2. Caption CC_DATA structures tagged as "field 2" contain caption channels 3 and 4. If video content is prepared with alternate content on channel 3 (a "field 2" packet), the process 300 may (e.g., in real-time or using batch processing) toggle the field 1/field 2 flag. This swaps channel 1 with channel 3 and channel 2 with channel 4, effectively bringing channel 3 captions into the forefront for players that do not understand captions beyond channel 1.

Figure 5:
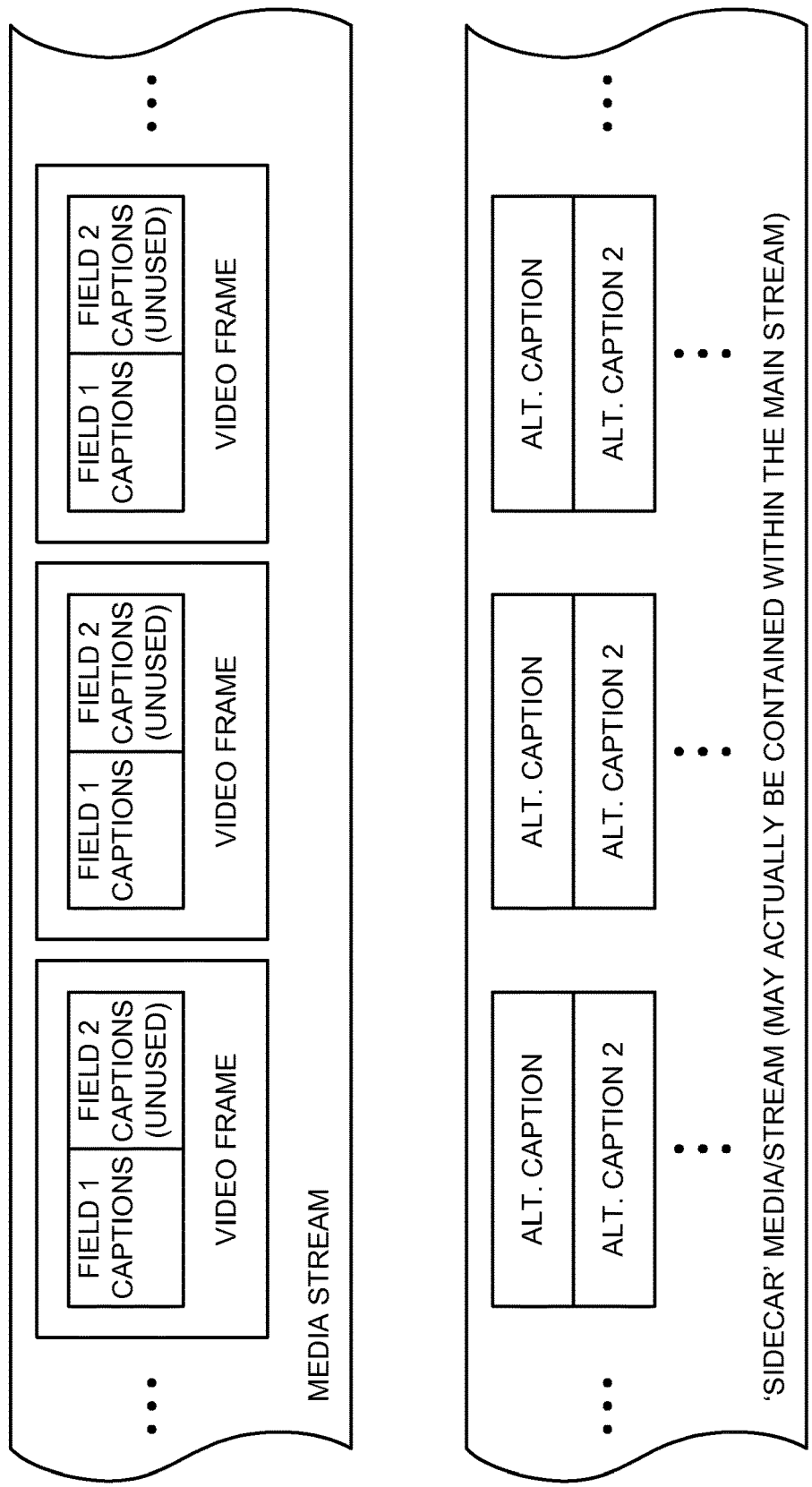
FIG. 5 is a diagram illustrating alternate captions provided as a sidecar file/stream.

Referring to FIG. 5, a diagram is shown illustrating an example where alternate captions are configured as a sidecar file/stream where alternate captions are configured as inactive data. In this case, several variants of caption packets may be implemented externally to the video stream. Such packets may be in "sidecar" files alongside the main video or may be contained as alternate content in the main video stream. In an example of streaming video with an alternate caption track, the packets may be taken from the sidecar and/or merged to the caption portion of the video stream (overwriting the existing caption packet), then served to the requesting device 102a.

Figure 6:
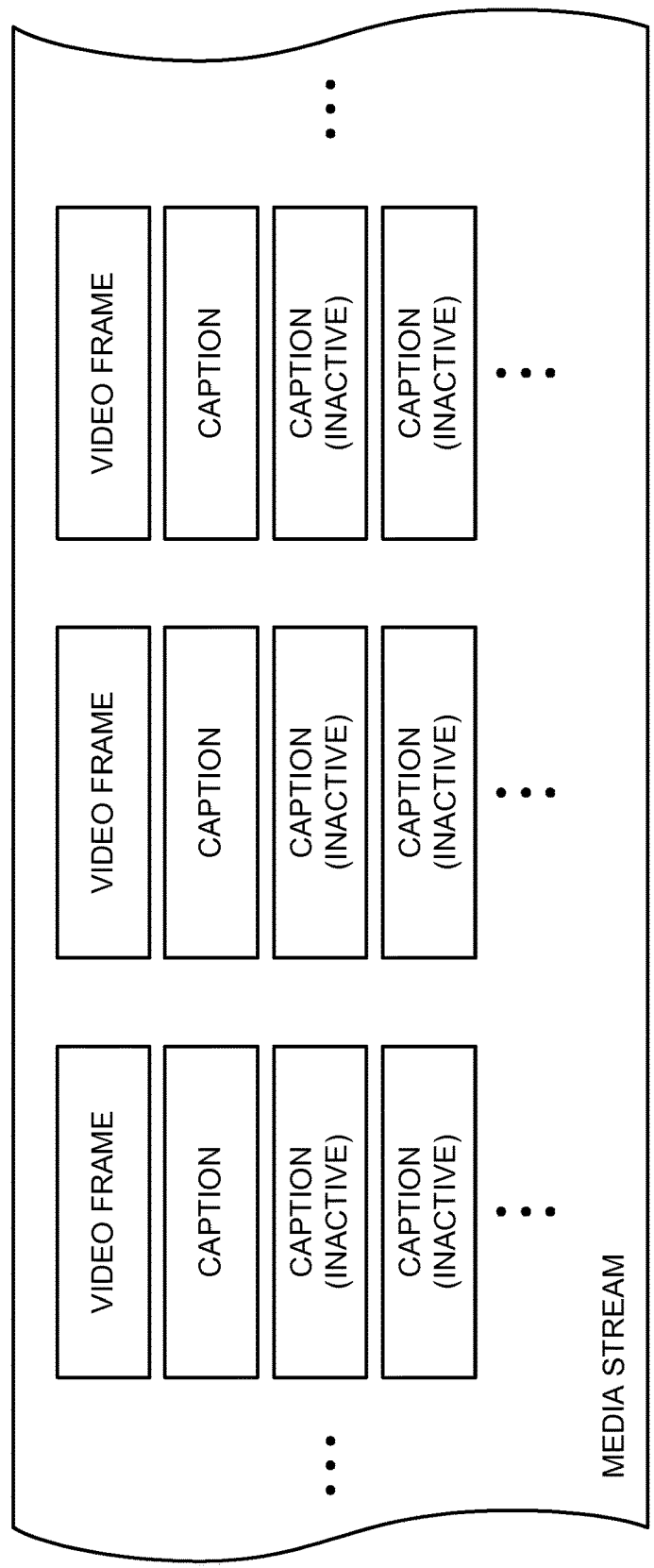
FIG. 6 is a diagram illustrating alternate captions provided as inactive data.

Referring to FIG. 6, a diagram illustrating alternate captions provided as inactive data is shown. In an h.264 bitstream, caption data is normally carried as NAL units. Specifically, NAL units may be configured with one or more of the following flags and/or property values set:

SEI type is USER_DATA_REGISTERED_ITU_T_T35 (0x04)

The Country and Provider 3-byte code is (0xb5, 0x00, 0x31)

The encoder 54 may create a package in the bitstream with alternate caption tracks with differing SEI types and/or country/provider codes. Modern, robust players will not necessarily understand the alternate caption tracks and will often skip them. In one example, the SEI types may be dynamically stripped before sending content to the players 102a-102n so that less robust players will not get confused.

The alternate caption tracks normally have a common identifying feature in the NAL Unit field of a track. For example, English may be the desired country/provider code, and Spanish may use one invalid country/provider code, French may use another code, etc. If the language is changed when generating a particular file, the code for the primary stream would be invalidated. Then all instances of the desired invalid code are changed to the correct code. In programming terms, such a procedure effectively "comments out" the packets of the undesired language and/or "uncomments" the packets of the desired language.

The swapping logic does not necessarily need to reside on the encoder and/or the re-packager circuits 100a-100n. In one example, the logic may reside in an outer layer of the player or in a proxy server between the video server 50 and the players 102a-102n. A similar process can be performed with the Picture User Data in MPEG2 streams, but by altering the user_data_identifier and/or user_data_type_code field.

Without the re-packager 100, to achieve similar results, a separate video stream would be saved for each caption language. With the re-packager 100, the video content and/or encoding would all be the same file, with only the caption payloads being changed on an as needed basis. The re-packager 100 may work around inadequacies in the caption display abilities of many video players. The re-packager 100 may provide the ability to receive multiple caption channels and fan the caption channels out into individual channels. Existing caption solutions either work with a single channel in and out, or funnel multiple sources into a single multi-channel caption stream.

As disability and/or captioning laws start to take hold on the accessibility of Internet sites, more online video sources will need to have captions. Additionally, as the re-packager 100 is implemented into multilanguage territories (e.g., Europe, Asia, etc.) the complexities get compounded. Outside of the desktop computer, the iPhone and iPad are among the biggest video consumption devices online. However, such devices tend to be extremely limited in their multilanguage caption ability.

The functions performed by the diagrams of FIG. 3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
an encoder configured to receive one or more source signals and generate one or more bitstreams, the one or more bitstreams each having (i) a video portion, (ii) a subtitle placeholder channel occupying a primary position in said bitstream, and (iii) a plurality of caption channels; and
a re-packager circuit configured to receive the one or more bitstreams from the encoder and to generate one or more re-packaged bitstreams in response to (i) one of said bitstreams and (ii) a selected one of said plurality of caption channels, wherein (A) said re-packager circuit moves said selected caption channel into said subtitle placeholder channel and (B) said selected caption channel moved to said primary position in said re-packaged bitstream is configured to be used without the need to select a particular caption channel by a player, wherein during playback the re-packager circuit is further configured to replace the selected caption channel with a different caption channel.

2. The apparatus according to claim 1, wherein said re-packager circuit generates said re-packaged bitstreams after said encoder generates said bitstreams.

3. The apparatus according to claim 1, wherein said re-packager circuit is configured to swap said placeholder channel from said primary channel position to a channel position previously occupied by said selected caption channel of said re-packaged bitstream.

4. The apparatus according to claim 1, wherein a default language caption is inserted into said placeholder channel prior to selecting one of said plurality of caption channels.

5. The apparatus according to claim 1, wherein said re-packager circuit generates a plurality of said re-packaged bitstreams, wherein each of said plurality of said re-packaged bitstreams comprises (i) said video portion and (ii) a different one of said plurality of caption channels.

6. The apparatus according to claim 1, wherein said selected caption channel is selected prior to generating said re-packaged bitstreams, in response to a caption request.

7. The apparatus according to claim 1, wherein said selected caption channel is automatically selected in response to information available about said player.

8. The apparatus according to claim 1, wherein said selected caption channel is automatically selected in response to geolocation information available about a location of said player.

9. The apparatus according to claim 1, wherein said re-packager circuit moves said selected caption channel into said subtitle placeholder channel prior to broadcasting.

10. The apparatus according to claim 1, wherein said re-packaged bitstreams has a same number of bits as one of said bitstreams.

11. The apparatus according to claim 1, wherein the re-packager circuit is further configured to:
determine alternate content is included on a different caption channel from the plurality of caption channels, wherein the player does not support the different caption channel; and
toggle a field flag in real time to swap the selected caption channel for the different caption channel.

12. The apparatus according to claim 1, wherein the selected caption channel is replaced with the different caption channel in response to an out-of-band request from the client device.

13. A system comprising:
a server configured to generate a video stream comprising (i) a video portion, (ii) a subtitle placeholder channel in a primary slot of a plurality of caption slots of said video stream and (iii) a caption portion, wherein said caption portion is (a) selected from a plurality of available caption portions received from an encoder, and (b) swapped into said subtitle placeholder channel as a re-packaged version of said video stream in response to a caption request, wherein the encoder generates the plurality of available caption portions; and
a client device configured to (i) play said re-packaged version of said video stream, (ii) automatically play said caption portion from said primary slot, and (iii) generate said caption request, wherein during playback the server is further configured to replace the caption portion with a different caption portion.

14. The system according to claim 13, wherein said video stream comprises a video on demand (VOD) stream.

15. The system according to claim 13, wherein said server stores a single copy of said video stream and said plurality of caption portions.

16. The system according to claim 13, wherein said server generates said video stream with any one of said caption portions in said subtitle placeholder channel.

17. The system according to claim 16, wherein said server is configured to re-package said video portion with any one of said caption portions in said subtitle placeholder channel.

18. The system according to claim 13, further comprising a plurality of client devices, wherein (i) said server generates one of said re-packaged versions of said video stream for each of said client devices, and (ii) each of said re-packaged versions of said video streams contains a different caption portion.

19. The system according to claim 13, further comprising a plurality of client devices, wherein (i) said server generates one of said re-packaged versions of said stream for each of said client devices, and (ii) each of said re-packaged versions of said video streams contains the same caption portion.

20. The system according to claim 13, wherein the server is further configured to:
determine alternate content is included on a different caption channel from the plurality of caption channels, wherein the client device does not support the different caption channel; and
toggle a field flag in real time to swap the selected caption channel for the different caption channel.

* * * * *